Dec. 28, 1965  A. KURTI  3,226,032
THRUST DEFLECTION DEVICE
Filed Dec. 24, 1962  4 Sheets-Sheet 1

INVENTOR
ALEXANDER KURTI
BY Vernon F. Hauschild
ATTORNEY

Dec. 28, 1965    A. KURTI    3,226,032
THRUST DEFLECTION DEVICE
Filed Dec. 24, 1962    4 Sheets-Sheet 2
FIG_3
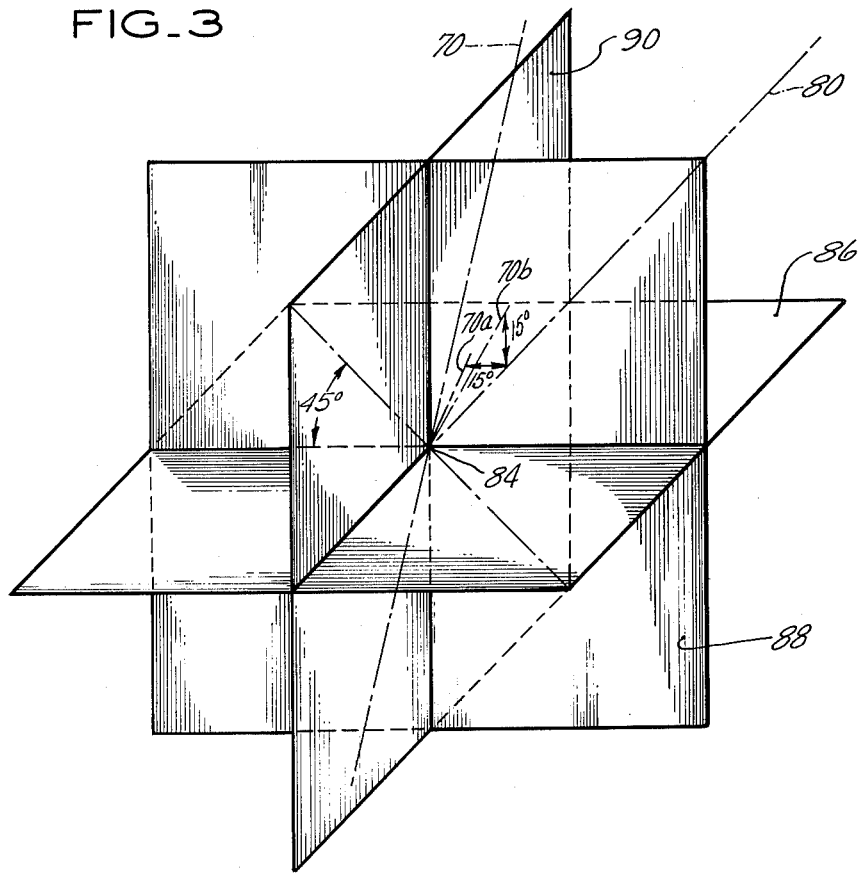
FIG_4
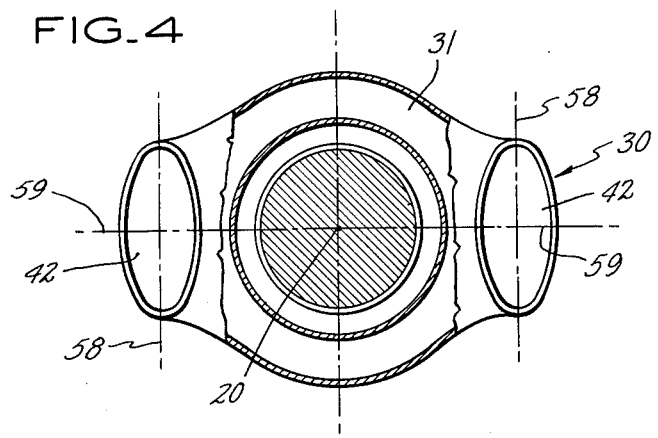
INVENTOR
ALEXANDER KURTI
BY *Vernon F. Hauschild*
ATTORNEY INVENTOR
ALEXANDER KURTI
BY Vernon F. Hauschild
ATTORNEY

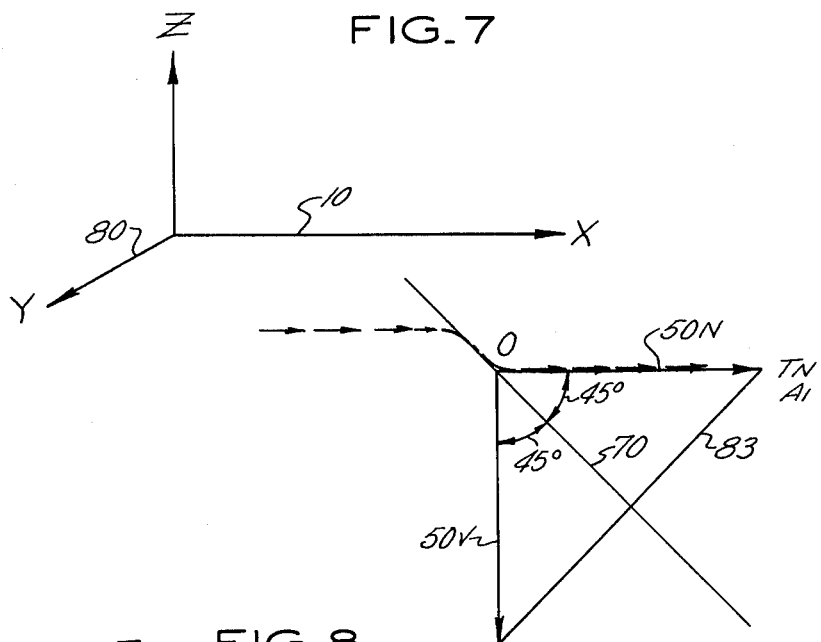
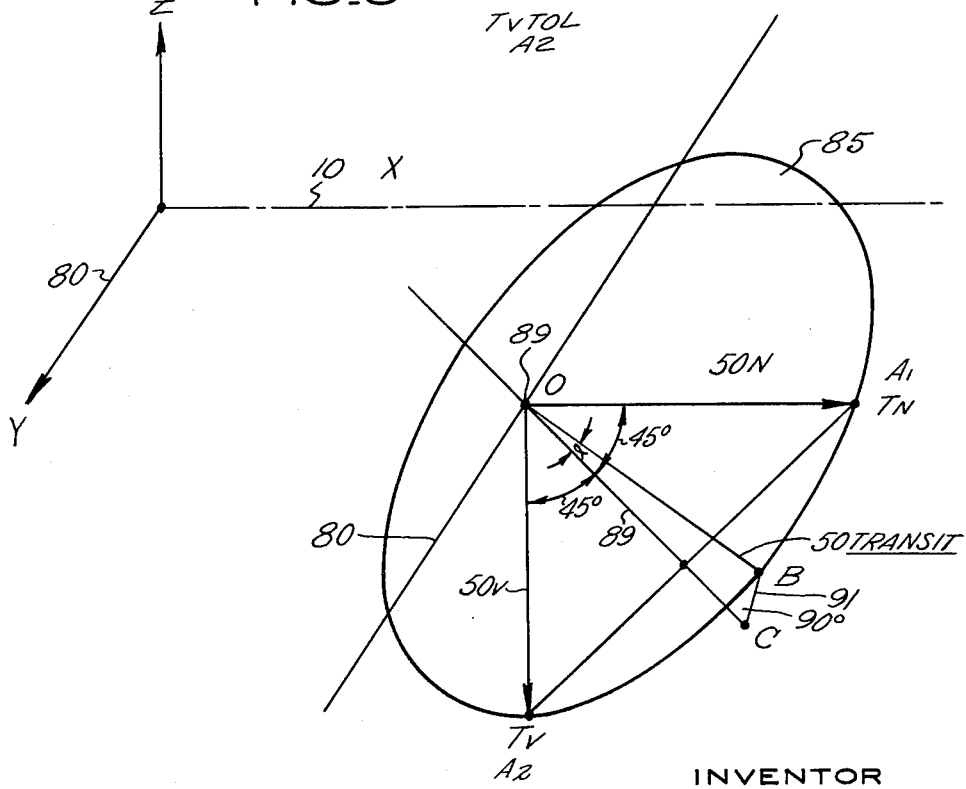

United States Patent Office 3,226,032
Patented Dec. 28, 1965

3,226,032
THRUST DEFLECTION DEVICE
Alexander Kurti, West Hartford, Conn., assignor to United Aircraft Corporation, East Hartford, Conn., a corporation of Delaware
Filed Dec. 24, 1962, Ser. No. 246,773
4 Claims. (Cl. 239—265.25)

This invention relates to jet propulsion vehicles and more particularly to the apparatus and method for providing both forward and vertical thrust therefor.

It is an object of this invention to teach apparatus and method for providing both forward and vertical thrust in a jet propulsion vehicle having minimum frontal area, which generates minimum side thrust during activation, and which causes minimum change in flow direction of the energized gases being passed therethrough.

It is a further object of this invention to teach forward and vertical thrust apparatus for a jet propulsion vehicle using hollow ducts and without using vanes for flow-turning purposes.

It is still a further object of this invention to teach an apparatus for accomplishing both forward and vertical thrust, which apparatus discharges exhaust gases substantially horizontally and rearwardly during forward thrust operation and substantially vertically and downwardly during vertical thrust operation. By way of compromise, either of these component directions may have to be altered in a particular flight vehicle installation due to such considerations as interference of parts and impingement of hot exhaust gases against aircraft parts.

It is still a further object of this invention to teach forward and vertical thrust apparatus for use with a jet propulsion vehicle utilizing oval ducts which are separated for relative motion therebetween along a plane to form a circular joint whose axis is selected such that during normal operation, forward thrust is being generated, and while during lift operation, vertical thrust is being generated and such that during transition operation between these two conditions, minimal side thrust is developed.

It is still a further object of this invention to teach forward and vertical thrust apparatus for a jet propulsion vehicle wherein the aforementioned circular joint axis defines a projected angle vertically above the engine transverse axis and which forms a second angle, equal to the first angle, horizontally forward of the engine transverse axis.

It is still a further object of this invention to teach thrust generating apparatus which produces both a horizontal, rearwardly moving exhaust gas stream parallel to the engine longitudinal axis producing a normal thrust vector during normal thrust and also produces a vertical, downwardly moving exhaust gas stream perpendicular to the engine longitudinal axis producing a normal thrust vector during vertical thrust and wherein said apparatus includes a duct of substantially oval cross section which is slit and movably joined such that the joint forms a circle, the axis of which lies between and in the plane of a first position which is perpendicular to the engine longitudinal axis and to the plane of the normal and vertical momentum vectors and which is parallel to the horizontal transverse engine axis and a second position in which the axis lies in a vertical plane parallel to the vertical plane through the engine longitudinal axis and lies in the vertical plane of and bisects the forward and vertical momentum vectors.

Other objects and advantages will be apparent from the specification and claims and from the accompanying drawings which illustrate an embodiment of the invention.

FIG. 3 is a three-plane drawing illustrating the position of the axis of the circular joint in the thrust deflection mechanism.

FIG. 4 is a rear view of the flow diverter to show the relative positions of the inlet and outlet taken along line 4—4 of FIG. 2.

FIG. 7 illustrates the other end position of the duct joint axis wherein the axis lies in the vertical plane of the normal and vertical momentum vectors $T_n$ and $T_v$ and in a vertical plane parallel to the vertical plane through the engine longitudinal axis and in a plane perpendicular to a vertical plane through the engine longitudinal axis.

FIG. 8 is an illustration of the position of the axis of my duct circular joint in an intermediate position between the FIG. 6 and FIG. 7 end positions.

Figure 1:
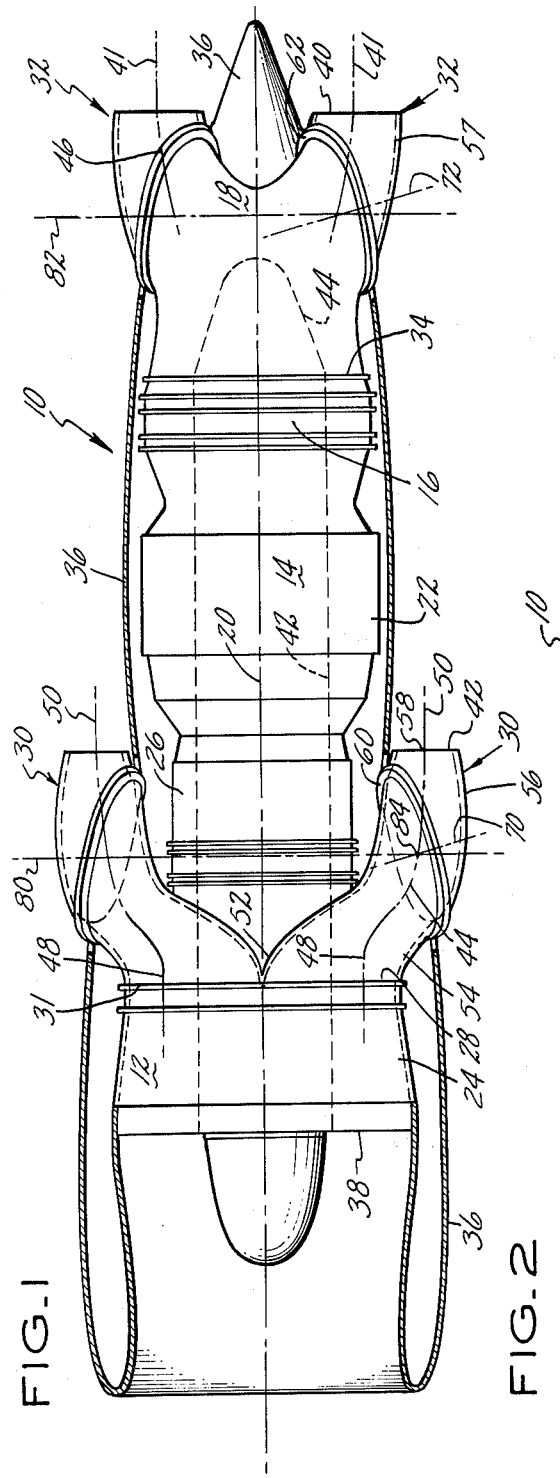
FIG. 1 is a top view of a jet propulsion vehicle using my invention.
Figure 2:
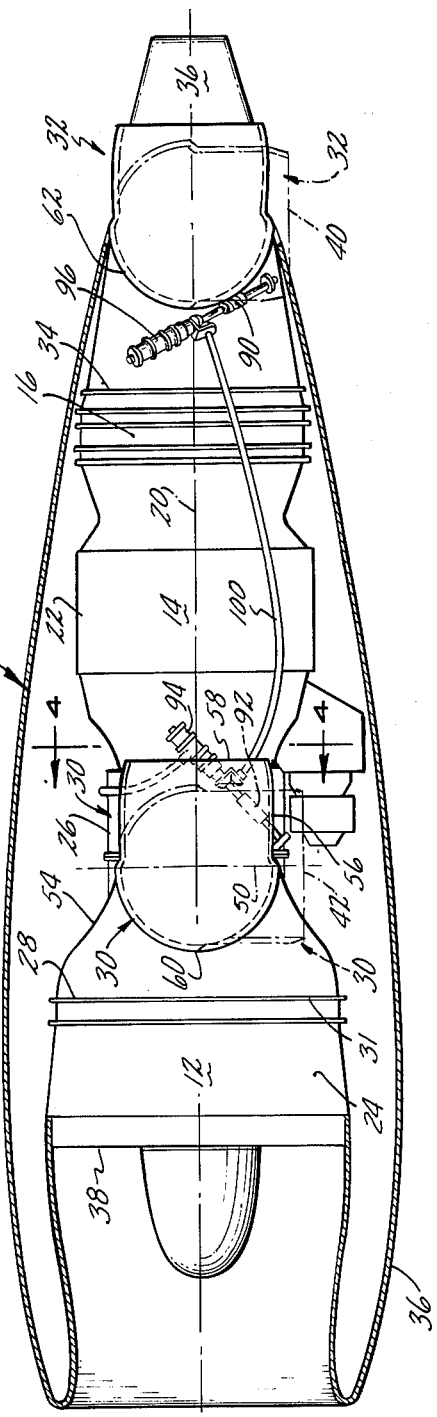
FIG. 2 is a side view corresponding to FIG. 1.

Referring to FIGS. 1 and 2 we see jet propulsion flight vehicle or engine 10 which is similar to the conventional turbo-jet engine in that it includes compressor section 12, burner section 14, turbine section 16, and outlet section 18 positioned axially along engine longitudinal axis 20. The compressor, burner, turbine, and outlet sections are confined within outer engine case 22 which is of generally circular cross section and concentric about engine longitudinal axis 20. The compressor includes forward or fan section 24 which is larger than compressor after section 26 and forms an annular outlet 28 therewith. Front forward and vertical thrust generating mechanism 30 has an annular inlet 31 which is connected to annular outlet 28 to receive energized gas therefrom At outlet section 18, rear forward and vertical thrust mechanism 32, which is similar in construction to mechanism 30 is attached at bolt circle 34 to the outlet of turbine 16. For purposes of illustration, the engine pod or nacelle is shown at 36 enveloping engine 10 to provide smooth areodynamic flow therearound.

In operation, air enters annular inlet 38 of compressor forward or fan section 24 and is compressed therein and discharged therefrom partially into front thrust diverter mechanism 30 while the remainder of the compressed air from compressor section 24 passes into after compressor 26 for further compression therein. After discharge from after compressor section 24, the energized gas has heat added thereto in burner section 14 and then passes through turbine section 16 to have sufficient energy extracted therefrom to drive compressor section 12. After passing through turbine section 16, the energized gases pass through outlet section 18 and are discharged to atmosphere through rear thrust reverser mechanism 32. The portion of the air from forward compressor section 24 which entered front flow diverter mechanism 30 is passed therethrough and discharged to atmosphere to generate thrust through vertical extending oval shaped outlet 42 best illustrated in FIG. 4.

The above is considered to be sufficient description of the operation of engine 10 because, except for the thrust diverter portions and enlarged compressor section 26, engine 10 may be of the general construction shown in U.S. Patent Nos. 2,711,631 and 2,747,367 to which reference may be had.

For purposes of illustration, deflector 30 in FIGS. 1 and 2, is illustrated to be on a bifurcated duct, but it should be borne in mind that one or more ducts with annular inlets could as well have been chosen. Further, outlet section 18 is also illustrated as a bifurcated duct, and while duct bifurcation in both instances has the advantage of producing symetric thrust generation, a different number of ducts could as well have been shown without deviating from the spirit of my invention. Further, the flow diverter ducts of members 30 and 32 could also join to and extend from apertures in the walls of outer case 22.

For the purpose of avoiding duplication in my explanation, the operation and construction of thrust deflector mechanism 30 only will be described but it should be borne in mind that thrust deflector mechanism 32 is constructed and operates in the same fashion.

As illustrated in FIG. 1, the gas being passed through engine 10 flows generally through the annular passage defined between outer case 22 and phantom line 42 which represents the inner peripheries of the compressor and turbine vanes and the inner burner case of burner section 14 and terminates in center body or tail cone 44. It will be noted that flow diverter mechanism 30 has a duct axis 44 and flow diverter mechanism 32 has a duct axis 46 both of which form small angles with longitudinal axis 20 of engine 10 throughout their lengths. This is important in avoiding flow losses of the energized gases being passed through these mechanisms, since sharp angular turns in the direction of flow are known to generate flow losses. The ducts of diverter mechanisms 30 and 32 are designed so that the direction of gas flow does not deviate more than 30° from axis 20 throughout their lengths. Thrust diverter mechanism 30 includes inlet section 31 whose flow axis at 48 is substantially parallel to its rear axis at 50, and both axes 48 and 50 are parallel to engine longitudinal axis 20. Mechanism 30, after bifurcation at 52 defines a forward duct 54 and an after duct 56, each of which are of substantially oval or elliptical cross-section and having larger axes, for example at 58, shown in FIGS. 1, 2 and 4, which are substantially vertically extending, and a minor axis 59 shown in FIG. 4, which are substantially horizontally extending.

After section 56 is pivotally or rotatably attached to fixed forward section 54 at circular joint 60, and there is a similar circular joint 62 in mechanism 32. Circular joint 60 is preferably a circular bearing mounted for rotation about joint axis 70, which corresponds to joint axis 72 of mechanism 32.

As previously mentioned, it is important that joint axis 70 be selected such that outlet 42 is lying in a vertical plane perpendicular to engine axis 20 and forming an oval with a substantially vertical major extending axis when in its forward thrust FIGS. 1 and 2 solid line position. Outlet 42 is also positioned immediately adjacent nacelle 36 or outer case 22 so as to present minimal frontal area in flight. This is also the reason for the oval shape of outlet 42. It is also important that diverter mechanisms 30 and 32 be operable to the vertical take-off position, shown in phantom in FIG. 2, with outlet 42 and outlet 40 lying in a horizontal plane and projecting vertically downward and with axes 41 and 50 extending vertically. It is also important that in being actuated between the forward thrust FIG. 1 position and the vertical thrust position shown in phantom in FIG. 2, that axes 41 and 50 generate or do not deviate much from a vertical plane or vertical planes throughout its motion. It has been found that these conditions are satisfied when joint axes 70 and 72 each define positive projected angles vertically above engine transverse axes 80 and 82, respectively, and also form positive projected angle horizontally forwardly of transverse axes 80 and 82, respectively, and that these two projected angles formed by joint axes 70 are equal, while these two projected angles formed by joint axes 72 are also equal.

It is therefore important that we select the poistion of the axis, such as 70, such that when circular joint 60 is posioitned thereby, the ductings of members 54 and 56 may be smoothly faired between inlet 31 and outlet 42 so that minimum change in direction is encountered by the energized gases flowing therethrough. This is an important consideration because thrust losses brought about by the energy losses caused by deviations in flow direction prevail at all times during normal flight operation. A second consideration is that outlet axis 50 should preferably be maintained in a vertical plane all times during and including transition between the normal thrust or solid line FIGS. 1 and 2 positions and the vertical thrust or phantom line FIG. 2 positions because deviation therefrom reduces the thrust generating efficiency of the nozzle. These two factors plus other associated factors such as the frontal area presented by the thrust diverter mechanism 30 and the practical consideration of impingement of exhaust gases against aircraft parts and prevention of part movement interference determine the choice of swivel joint axis 70.

Figure 5:
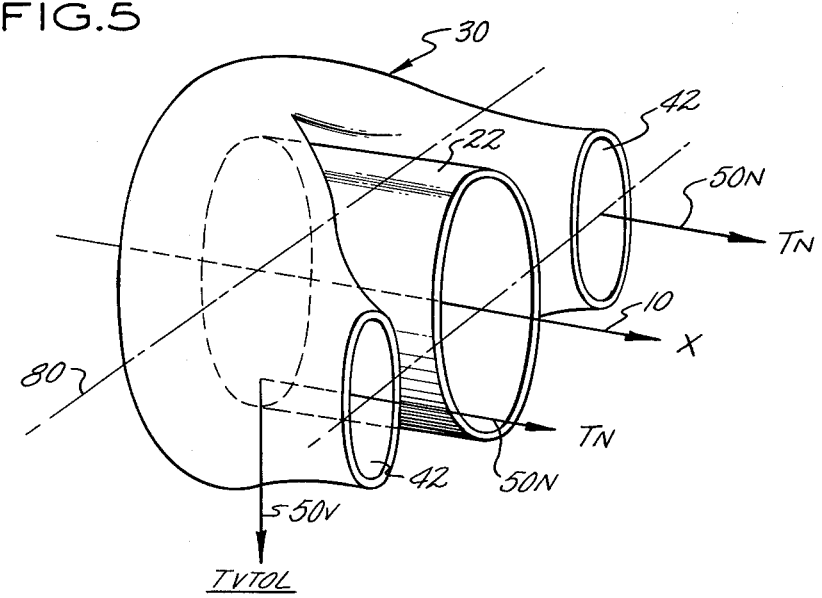
FIG. 5 is a schematic perspective illustration of my thrust generating mechanism to illustrated the relationship between the engine longitudinal axis and the normal momentum vectors $T_n$ generated by my apparatus.

FIG. 5 shows a schematic, perspective illustration of the thrust diverter 30 in relation to engine longitudinal axis 10 and engine transverse axis 80, both of which lie in a horizontal plane. The momentum vector for normal or forward thrust generated by passing energized gas through outlet 42 is indicated as $T_n$ which extends along outlet axis 50 when in its normal thrust generating position, designated as $50_n$. The corresponding vertical momentum vector is designated as $T_v$ or $T_{VTOL}$, which extends along outlet axis 50 of diverter mechanism 30 when in its vertical thrust or FIG. 2 phantom position, and is designated as $50_v$.

Figure 6:
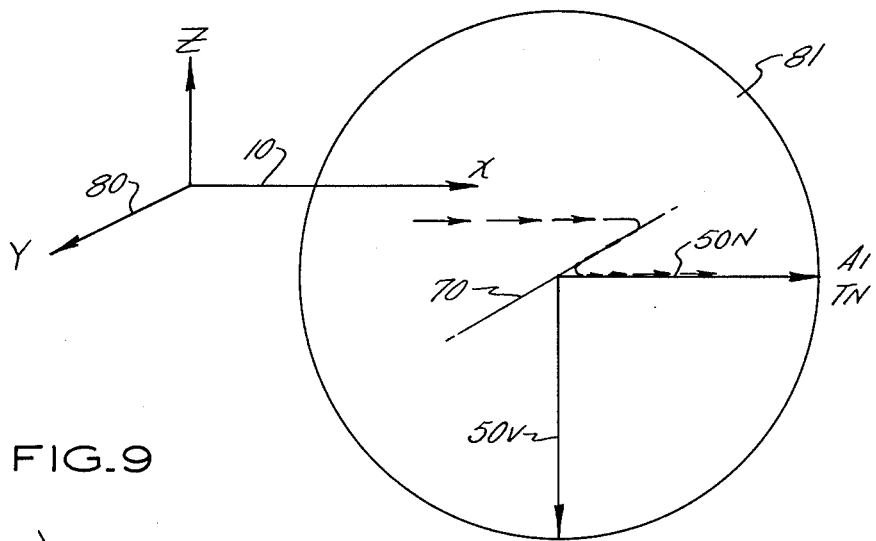
FIG. 6 illustrates one of the end positions of the circular joint axis wherein the axis lies in a horizontal plane perpendicular to the engine longitudinal axis and to the vertical plane of the normal momentum vector $T_n$ and vertical thrust momentum vector $T_v$.

It has been found that thrust diverter mechanism 30 can be designed such that normal thrust axis $50_n$ and momentum vector $T_n$ can be rearwardly extending and in a horizontal plane parallel to engine axis 10 while vertical axis $50_v$ and vertical momentum vector $T_v$ can be vertically extending and in a vertical plane parallel to engine longitudinal axis 10, when axis 70 is positioned somewhere in and between and in the plane of two end positions shown in FIGS. 6 and 7.

In the FIG. 6 end posiiton, axis 70 lies in a horizontal plane and is perpendicular to engine longitudinal axis 10 and to the plane 81 of vectors $T_n$ and $T_v$. In the FIG. 6 configuration, the tip of vector 50 of outlet 42 defines 90° of a circle lying in vertical plane 81 when it moves from its normal thrust position illustrated as $50_n$ to its vertical thrust position illustrated at $50_v$. This, of course, produces no loss in thrust efficiency due to deviations from vertical plane 81 during this transition, however, it will be noted by observing the arrows in FIG. 6, which illustrate the direction of flow of the energized gases passing through thrust diverter 30, that the exhaust gases passing therethrough encounter two severe changes in the direction of flow and hence are subjected to flow losses which are reflected as thrust losses. Accordingly, the FIG. 6 end position is an undesirable position for axis 70 due to thrust losses encountered therein due to flow loss caused by drastic changes in flow direction.

The second end position for axis 70 is illustrated in FIG. 7 with vectors $T_n$ and $T_v$ and axes $50_n$ and $50_v$ shown in the same position as in FIG. 6. In this position, axis 70 lies in the plane of vectors $T_n$ and $T_v$ and bisects the right angle formed therebetween, thus that it defines a 45° angle with each of these vectors. In the FIG. 7 construction, however, in moving about axis 70 from its normal thrust position of $50_n$ to its vertical thrust position of $50_v$, axis 50 must pass through 180° of the cone which is generated by revolving axes $50_n$ and $50_v$ about axis 70. This cone has its circular base perpendicular to the plane of the paper in FIG. 7 such that it is shown along plane or line 83. Since axis 50 must rotate through 180° to get from its normal $50_n$ position to its vertical $50_v$ position, it will be obvious that at the 90° position of rotation, axis 50 generates an angle of 45° with axis 70 at its position of maximum deviation from the vertical. It will therefore be seen that while the energized gases passing through the FIG. 7 construction encounter small changes in directional flow as illustrated by the flow arrows, the FIG. 7 construction generates maximum thrust loss during transition between its normal and vertical thrust positions.

For an optimum configuration reflecting a compromise between the flow turning losses of the FIG. 6 configuration and the thrust deviation losses of the FIG. 7 configuration, it will be necessary to place axis 70 in a position between and in the plane of the end position of axis 70 shown in FIGS. 6 and 7.

Figure 9:
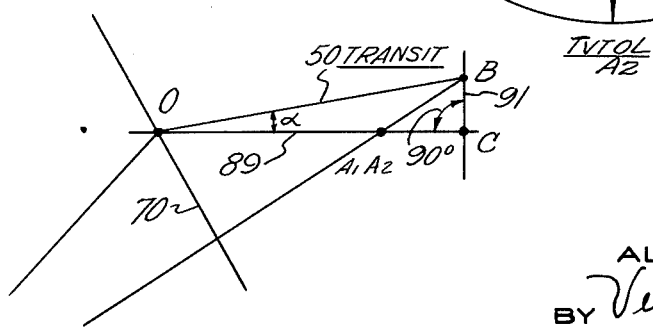
FIG. 9 is a geometric representation of the maximum sideload or thrust efficiency loss position which will be encountered when my thrust mechanism is in transition between the normal momentum $T_n$ and the vertical momentum $T_v$ position in the FIG. 8 configuration.

FIGS. 8 and 9 illustrate such an intermediate or compromise position wherein axis $50_n$ and $50_v$ and vectors $T_n$ and $T_v$ are in the same position as shown in FIGS. 6 and 7. Axis 70 is positioned between the FIG. 6 and FIG. 7 end positions such that its projection bisects the right angle between axes $50_n$ and $50_v$ and vectors $T_n$ and $T_v$ and such that axes $50_n$ and $50_v$ generate shallow cone 85 with apex 89, when revolved about axis 70. When axis 70 is in its FIG. 8 and 9 position, axis 50 must transit along shallow cone 85 between its normal thrust position $50_n$ and its vertical thrust position $50_v$. When axis 50 has travelled half way from its normal thrust $50_n$ position along cone 85, it is at its position of maximum deviation from the vertical plane in which axes $50_n$ and $50_v$ lie and is in the position designated in FIGS. 8 and 9 as $50_{transit}$. With axis 50 in its $50_{transit}$ position of FIGS. 8 and 9 it forms angle $\alpha$ in the right triangle formed between axis $50_{transit}$, line 89, which bisects the right angle between axes $50_n$ and $50_v$ and lies in the vertical plane thereof, and the perpendicular line thereto 91 which extends perpendicularly to line 89 and intersects line $50_{transit}$ at base circle 87 of cone 85.

FIG. 9 represents a planed view of the FIG. 8 triangle just described in relation to axis 70 and it will be seen that the thrust efficiency of my thrust defining mechanism 30, when axis 50 thereof is in positioned $50_{transit}$ will be equal to the cosine of the angle $\alpha$ as shown in FIG. 9.

It will accordingly be seen that FIGS. 8 and 9 represent a method of determining the thrust efficiency in transit of thrust diverter mechanism 30 when axis 70 is in a selected position between and in the plane of the FIG. 6 and 7 axis 70 end positions. This transit thrust efficiency can be compared with the thrust loss due to flow directional changes of the energized gas being passed through thrust diverter 30 when axis 70 is in its FIG. 8 and 9 and to these results obtained in all other intermediate positions between and in the plane of the FIGS. 6 and 7 axis 70 end positions until the optimum position of axis 70 is found for any particular flight vehicle installation.

A preferred or suggested position of circular joint axes 70 and 72 is illustrated in FIG. 3 wherein the intersection of engine transverse or lateral axis 80 and joint axis 70 is illustrated at 84, with horizontal plane 86 passing therethrough, together with vertical plane 88 which is parallel to engine longitudinal axis 20 and perpendicular to transverse axis 80 also passing therethrough, and with vertical plane 90 which includes engine longitudinal axis 80 passing therethrough.

It will be noted that joint axis 70 forms about a 15° projected angle vertically above axis 80 in plane 90 and a 15° projected angle forward of transverse axis 80 in plane 86 and a 45° projected angle above horizontal plane 86 in vertical plane 88.

For the preferred configuration illustrated in FIG. 3, test results show a thrust loss of .5% during transit of my flow diverter mechanism 30 between its normal and vertical thrust positions and pressure drop of .6% when mechanism 30 is in its normal thrust position.

Applicant has found that optimum performance is achieved when the above projected angles on planes 86 and 90 are 15°. If equal but larger projected angles are used, such as 25° angles, greater side thrust will be encountered from members 30 and 32 during duct movement from the FIGS. 1 and 2 solid line, forward thrust position to the FIG. 2 phantom, vertical take-off position. If equal but smaller projected angles are used, such as 5°, more severe duct bends with the attendant flow losses and possibly the need for flow turning vanes, would be encountered.

As best shown in FIG. 2, mechanisms 30 and 32 may include worm gears on the outer periphery of the downstream rotatable ducts 56 and 57 which are preferably synchronously actuated by worm gears 90 and 92 which are driven by synchronized motors such as are motors 94 and 96 which are joined through synchronizing shaft 100.

It is to be understood that the invention is not limited to the specific embodiment herein illustrated and described but may be used in other ways without departure from its spirit as defined by the following claims.

I claim:

1. A jet propulsion engine which produces thrust by discharging energized gas to atmosphere and having forward and rearward ends and a main case of circular cross-section and concentric about a longitudinal axis, forward and vertical thrust generating means comprising ducts of oval shaped cross-section communicating with said case on each side thereof to receive energized gas therefrom and extending rearwardly from each side thereof defining an exhaust outlet of oval shaped cross-section with a substantially vertically extending major axis and lying in a vertical plane perpendicular to said case avis, each duct including separate forward and rearward sections rotatably joined in a circular joint, said circular joint being so positioned that said duct rearward section may rotate about the joint axis from a first position wherein said outlet faces rearwardly, and then through intermediate positions wherein said major axis remains in substantially the same vertical plane, and to a second position wherein said outlet faces downwardly.

2. A jet propulsion engine which produces thrust by discharging energized gas to atmosphere and having forward and rearward ends and a main case of circular cross-section and concentric about a longitudinal axis, forward and vertical thrust generating means comprising a duct communicating with said case to receive energized gas therefrom and extending rearwardly therefrom and defining an exhaust outlet of oval shaped cross-section with a substantially vertically extending major axis and lying in a vertical plane perpendicular to said case axis, said duct comprising a fixed forward section and a separate rotatable rearward section rotatably joined in a circular joint, said circular joint being so positioned that said duct rearward section may rotate about the joint axis from a first position wherein said outlet faces rearwardly, and then through intermediate positions wherein said major axis remains in substantially the same vertical plane, and to a second position wherein said outlet faces downwardly and wherein said main case has both a longitudinal and transverse axis, and wherein said joint axis defines a first positive projected angle vertically from said transverse axis and a second positive projected angle horizontally forward from said transverse axis, and wherein said first and second angles are substantially equal.

3. Apparatus according to claim 2 wherein said angles equal about 15 degrees.

4. Apparatus according to claim 1 wherein said duct is so shaped that the direction of gas flow therethrough defines angles less than 30 degrees with said case axis throughout their lengths.

(References on following page)

References Cited by the Examiner

UNITED STATES PATENTS

| | | | |
|---|---|---|---|
| 2,886,262 | 5/1959 | Fletcher | 60—35.55 |
| 3,025,667 | 3/1962 | Moorehead | 60—35.55 |
| 3,027,713 | 4/1962 | Tyler et al. | 60—35.655 |
| 3,056,258 | 10/1962 | Marchant et al. | 60—35.55 |

FOREIGN PATENTS

| | | |
|---|---|---|
| 1,208,414 | 2/1960 | France. |
| 861,480 | 2/1961 | Great Britain. |

MARK NEWMAN, *Primary Examiner.*
ABRAM BLUM, *Examiner.*
W. A. SCHUETZ, *Assistant Examiner.*